United States Patent
Kim

(10) Patent No.: US 11,305,670 B2
(45) Date of Patent: Apr. 19, 2022

(54) DEVICE AND METHOD FOR CONTROLLING BATTERY IN VEHICLE

(71) Applicants: Hyundai Motor Company, Seoul (KR); Kia Motors Corporation, Seoul (KR)

(72) Inventor: Dae Kwang Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/036,331

(22) Filed: Sep. 29, 2020

(65) Prior Publication Data

US 2021/0300209 A1    Sep. 30, 2021

(30) Foreign Application Priority Data

Mar. 26, 2020  (KR) .................. 10-2020-0037052

(51) Int. Cl.
| | |
|---|---|
| *B60L 1/00* | (2006.01) |
| *B60L 58/20* | (2019.01) |
| *B60L 58/12* | (2019.01) |
| *H02J 7/14* | (2006.01) |
| *B60L 50/61* | (2019.01) |

(52) U.S. Cl.
CPC .............. *B60L 58/20* (2019.02); *B60L 50/61* (2019.02); *B60L 58/12* (2019.02); *H02J 7/1423* (2013.01); *H02J 2310/48* (2020.01)

(58) Field of Classification Search
CPC  B60L 58/12; B60L 58/20; B60L 50/61; H02J 2310/48; H02J 7/1423
USPC ........................................................ 307/10.1
See application file for complete search history.

(56) References Cited

U.S. PATENT DOCUMENTS

| | | | |
|---|---|---|---|
| 2012/0193988 A1* | 8/2012 | Eschrich | ................ B60L 50/61 307/66 |
| 2018/0191185 A1* | 7/2018 | Al Rasheed | ............ B60L 58/13 |

FOREIGN PATENT DOCUMENTS

| | | |
|---|---|---|
| JP | 5434879 B2 | 3/2014 |
| JP | 5541134 B2 | 7/2014 |

* cited by examiner

*Primary Examiner* — Rexford N Barnie
*Assistant Examiner* — Dru Parries
(74) *Attorney, Agent, or Firm* — Mintz Levin Cohn Ferris Glovsky and Popeo, P.C.; Peter F. Corless

(57) ABSTRACT

A device for controlling a battery in a vehicle is provided and includes a sensor that senses states of charge of a plurality of batteries and a controller that controls connection of one of the plurality of batteries to adjust voltages applied to the plurality of batteries and an electronic device based on a determination result of whether a load has occurred on the electronic device connected to the one of the plurality of batteries and a state of charge of the one of the plurality of batteries. Thus, when the load occurs on the electronic device, the device controls the connection of the battery to improve a fuel efficiency.

6 Claims, 8 Drawing Sheets

DEVICE AND METHOD FOR CONTROLLING BATTERY IN VEHICLE

CROSS-REFERENCE TO RELATED APPLICATION

This application claims the benefit of priority to Korean Patent Application No. 10-2020-0037052, filed on Mar. 26, 2020, the entire contents of which are incorporated herein by reference.

TECHNICAL FIELD

The present disclosure relates to a device and a method for controlling a battery in a vehicle, and more particularly, to a device and a method for controlling a battery in a vehicle that controls a connection of a battery that supplies power to an electronic device to reduce cost and improve a fuel efficiency.

BACKGROUND

Various electronic devices are mounted on a vehicle, and an alternator and batteries are mounted as a power supply of such electronic devices. The alternator is driven by an engine, which is a power source of the vehicle. The alternator is connected to an output shaft of the engine through a belt, and the batteries are charged with a voltage generated by the alternator. The batteries may include a high voltage battery for supplying driving power and an auxiliary battery for supplying operating power to the internal electronic device.

Generally, the alternator prohibits voltage control for driving the electronic device and allows the batteries to be charged all the time when a load is generated in the electronic device. Charging the batteries continuously causes unnecessary voltage increase and fuel efficiency reduction. In addition, in some cases, a direct current-direct current (DC-DC) converter is mounted to adjust the voltage for driving the electronic device, but this has a disadvantage of increasing cost.

SUMMARY

The present disclosure provides a device and a method for controlling a battery in a vehicle that may control a connection of a battery that supplies power to an electronic device, thereby reducing cost and improving a fuel efficiency. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling a battery in a vehicle may include a sensor configured to sense states of charge of a plurality of batteries, and a controller configured to control connection of one of the plurality of batteries to adjust voltages applied to the plurality of batteries and an electronic device based on a determination result of whether a load has occurred on the electronic device connected to the one of the plurality of batteries and a state of charge of the one of the plurality of batteries.

In one exemplary embodiment, the device may further include an alternator configured to adjust the voltages supplied to the plurality of batteries based on the operation of the controller, a first switch disposed between the alternator and the one of the plurality of batteries, a second switch disposed between the one of the plurality of batteries and the electronic device, and a third switch disposed between the alternator and the electronic device. The controller may be configured to determine whether the state of charge of the one of the plurality of batteries exceeds a first reference value in response to determining that the load has occurred on the electronic device.

In addition, the controller may be configured to turn off the first switch to disconnect the alternator and the battery from each other, to turn off the third switch to disconnect the alternator and the electronic device from each other, and to turn on the second switch to connect the battery and the electronic device with each other in response to determining that the state of charge of the one of the plurality of batteries exceeds the first reference value. The controller may be configured to determine whether the state of charge of the one of the plurality of batteries exceeds a second reference value less than the first reference value in response to determining that the state of charge of the one of the plurality of batteries is less than the first reference value.

The controller may be configured to turn on the first switch to connect the alternator and the battery with each other, to turn on the second switch to connect the battery and the electronic device with each other, and to turn off the third switch to disconnect the alternator and the electronic device from each other in response to determining that the state of charge of the one of the plurality of batteries exceeds the second reference value. In one exemplary, the controller may be configured to turn on the first switch to connect the alternator and the battery with each other, to turn off the second switch to disconnect the battery and the electronic device from each other, and to turn on the third switch to connect the alternator and the electronic device with each other in response to determining that the state of charge of the one of the plurality of batteries is less than the second reference value.

According to another aspect of the present disclosure, a device for controlling a battery in a vehicle may include an alternator configured to adjust voltages supplied to a plurality of batteries, a first switch connected to the alternator and at least one of the plurality of batteries, and a second switch disposed between the alternator and an electronic device.

According to another aspect of the present disclosure, a method for controlling a battery in a vehicle may include determining whether a load has occurred on an electronic device connected to one of a plurality of batteries, and controlling connection of the one of the plurality of batteries to adjust voltages applied to the plurality of batteries and the electronic device based on a determination result of whether the load has occurred on the electronic device and a state of charge of the one of the plurality of batteries.

In one exemplary embodiment, the method may further include adjusting, by an alternator, the voltages supplied to the plurality of batteries, disposing a first switch between the alternator and the one of the plurality of batteries, disposing a second switch between the one of the plurality of batteries and the electronic device, and disposing a third switch between the alternator and the electronic device. In addition, the method may include determining whether the state of charge of the one of the plurality of batteries exceeds a first reference value in response to determining that the load has occurred on the electronic device.

The method may further include turning off the first switch to disconnect the alternator and the battery from each other, turning off the third switch to disconnect the alternator and the electronic device from each other, and turning on the second switch to connect the battery and the electronic device with each other in response to determining that the state of charge of the one of the plurality of batteries exceeds the first reference value. In one exemplary embodiment, the method may further include determining whether the state of charge of the one of the plurality of batteries exceeds a second reference value less than the first reference value in response to determining that the state of charge of the one of the plurality of batteries is less than the first reference value.

The method may further include turning on the first switch to connect the alternator and the battery with each other, turning on the second switch to connect the battery and the electronic device with each other, and turning off the third switch to disconnect the alternator and the electronic device from each other in response to determining that the state of charge of the one of the plurality of batteries exceeds the second reference value. In one exemplary embodiment, the method may further include turning on the first switch to connect the alternator and the battery with each other, turning off the second switch to disconnect the battery and the electronic device from each other, and turning on the third switch to connect the alternator and the electronic device with each other in response to determining that the state of charge of the one of the plurality of batteries is less than the second reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
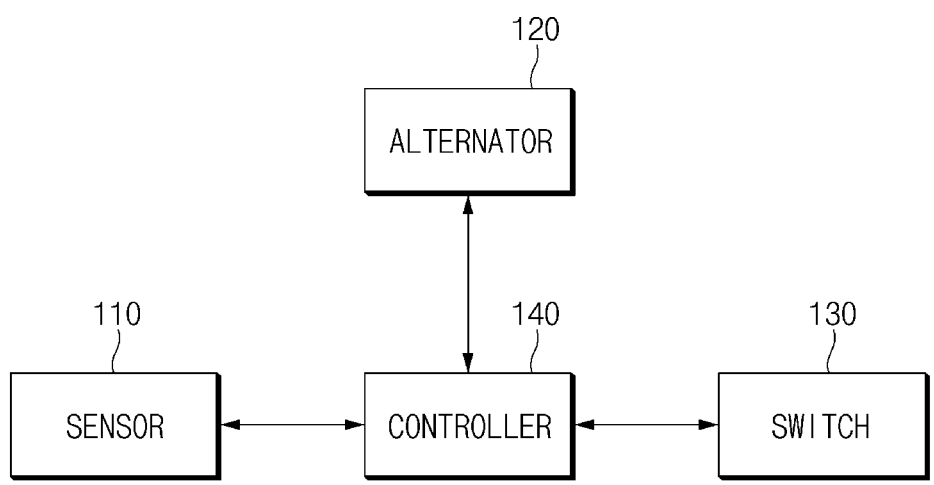
FIG. 1 is a configuration diagram illustrating a configuration of a vehicle battery control device of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the exemplary embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a configuration diagram illustrating a configuration of a vehicle battery control device of the present disclosure. As shown in FIG. 1, a vehicle battery control device 100 according to an exemplary embodiment of the present disclosure may include a sensor 110, an alternator 120, a switch 130, and a controller 140. The sensor 110 may be configured to sense a state of charge (SOC) of a battery.

The alternator 120 may include a generator configured to generate an alternating current to charge the battery even at a relatively low engine speed. The alternator 120 may be configured to adjust an output voltage from an engine as an arbitrary voltage supplied to the battery, and a voltage output from the alternator 120 may charge the battery. The switch 130 may include a first switch disposed between the alternator 120 and the battery, a second switch disposed between the battery and an electronic device, and a third switch disposed between the alternator and the electronic device. In addition, ON/OFF of the switch 130 may be executed in response to a control signal of the controller 140.

The controller 140 may be implemented by various processing devices such as a microprocessor and the like having a semiconductor chip and the like embedded therein capable of operation or execution of various instructions. In addition, the controller 140 may be configured to execute an operation of the vehicle battery control device according to an exemplary embodiment of the present disclosure. Specifically, the controller 140 may be configured to adjust voltages applied to the battery and the electronic device by controlling connection of the battery based on a determination result of whether a load has occurred on the electronic device connected to the battery and the state of charge of the battery. An operation of the controller 140 will be described in more detail with reference to FIGS. 2 and 3.

Figure 2:
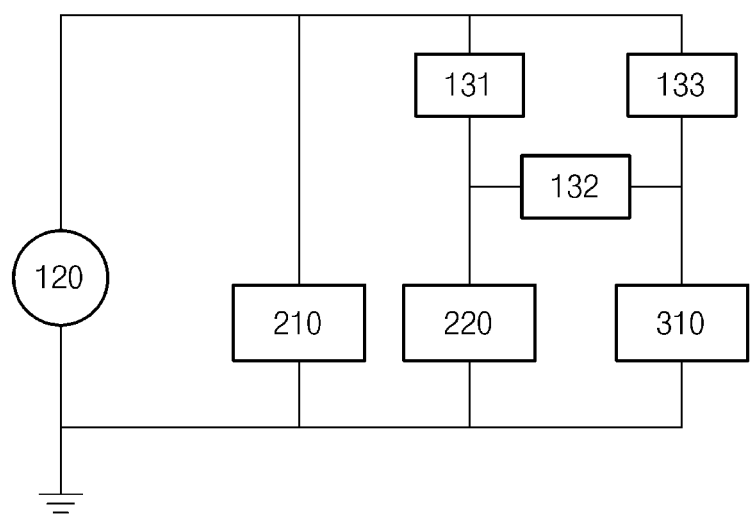
FIG. 2 is a diagram illustrating a connection state of batteries according to an exemplary embodiment of the present disclosure.
Figure 3:
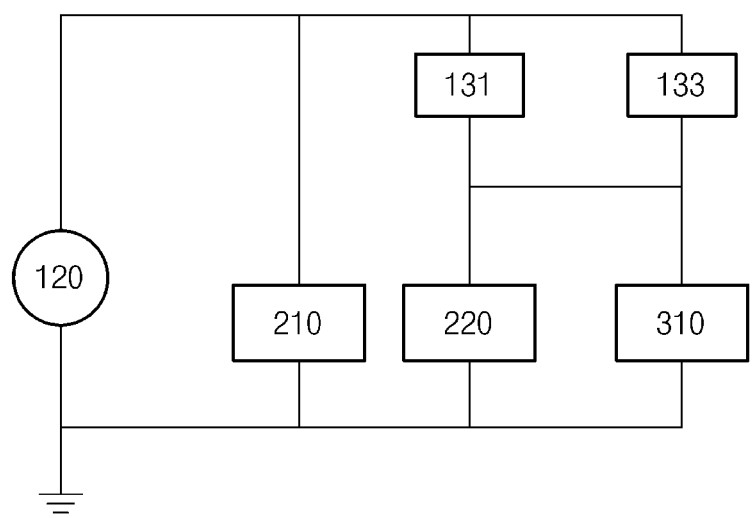
FIG. 3 is a diagram illustrating a connection state of batteries according to another exemplary embodiment of the present disclosure.

FIG. 2 is a diagram illustrating a connection state of batteries according to an exemplar)/embodiment of the present disclosure, and FIG. 3 is a diagram illustrating a connection state of batteries according to another exemplar)/embodiment of the present disclosure.

According to an exemplar)/embodiment of the present disclosure, as shown in FIG. 2, the alternator 120, a first battery 210, a second battery 220, and an electronic device 310 may be connected to each other in a parallel structure. In this connection, the alternator 120 may be configured to adjust voltages applied to the first battery 210, the second battery 220, and the electronic device 310 in response to a control signal of the controller 140. The first battery 210 may include a lead acid battery, the second battery 220 may include a lithium ion battery, and the electronic device may include an electronic device mounted in a vehicle. As an example, the electronic device may include a head lamp, a blower fan, a wiper, and the like. A first switch 131 may be disposed between the alternator 120 and the second battery 220, a second switch 132 may be disposed between the second battery 220 and the electronic device 310, and a third switch 133 may be disposed between the alternator 120 and the electronic device 310. In this connection, the second switch 132 disposed between the second battery 220 and the electronic device 310 is removable, and such case may be implemented as shown in FIG. 3.

The controller 140 may be configured to determine whether a load has occurred on the electronic device 310. In this connection, the load may refer to a state in which a voltage applied to the electronic device 310 is changed. Accordingly, the determining, by the controller 140, of whether the load has occurred on the electronic device 310 is understood as determining whether the voltage applied to the electronic device 310 is being applied as a required voltage of the electronic device 310.

When determining that the load has occurred on the electronic device 310, that is, determining that the voltage applied to the electronic device 310 is applied in the changed state rather than the required voltage of the electronic device 310, the controller 140 may be configured to determine whether a state of charge of the second battery 220 exceeds a first reference value. In this connection, the first reference value may refer to a state of charge of a battery capable of applying a voltage of a magnitude of not causing a performance change of the electronic device 310 to the electronic device 310. Therefore, in response to determining that the state of charge of the second battery 220 exceeds the first reference value, the controller 140 may be configured to determine that the second battery 220 is able to apply the voltage of the magnitude of not causing the performance change of the electronic device 310 to the electronic device 310.

In response to determining that the state of charge of the second battery 220 exceeds the first reference value, the controller 140 may be configured to turn off the first switch 131 to disconnect the alternator 120 and the second battery 220 from each other, to turn off the third switch 133 to disconnect the alternator 120 and the electronic device 310 from each other, and to turn on the second switch 132 to connect the second battery 220 and the electronic device 310 with each other. Accordingly, as the controller 140 disconnects the alternator 120 and the second battery 220 from each other, the alternator 120 may be configured to adjust the voltage based on a state of the first battery 210 and a traveling pattern of the vehicle and the second battery 220 may be configured to adjust the voltage based on the required voltage of the electronic device 310, thereby improving a fuel efficiency. The controller 140 may allow the first battery 210 and the second battery 220 to be fully charged in a fuel cut section, and minimize the charging and allow available energy to be discharged in a section excluding the fuel cut section.

In response to determining that the state of charge of the second battery 220 is less than the first reference value, the controller 140 may be configured to determine whether the state of charge of the second battery 220 exceeds a second reference value. In this connection, the second reference value may refer to a lower limit value of the state of charge of the battery capable of adjusting the voltage applied to the electronic device 310. Therefore, in determining that the state of charge of the second battery 220 exceeds the second reference value, the controller 140 may be configured to determine that the second battery 220 is able to adjust the voltage applied to the electronic device 310.

In addition, in the process of determining whether the state of charge of the second battery 220 exceeds the second reference value, the controller 140 may be configured to determine whether an electric potential of the second battery 220 is greater than an electric potential of the first battery 210. Although the first battery 210 and the second battery 220 are connected with each other in a substantially parallel structure, when the electric potential of the second battery 220 is greater than the electric potential of the first battery 210, it may be determined that the second battery 220 is leading the power supply to the electronic device 310.

In response to determining that the state of charge of the second battery 220 exceeds the second reference value and determining that the electric potential of the second battery 220 is greater than the electric potential of the first battery 210, the controller 140 be configured to turn on the first switch 131 to connect the alternator 120 and the second battery 220 with each other, to turn on the second switch 132 to connect the second battery 220 and the electronic device 310 with each other, and turn off the third switch 133 to disconnect the alternator 120 and the electronic device 310 from each other. Since the electric potential of the second battery 220 is greater than the electric potential of the first battery, the controller 140 may be configured to determine that the second battery 220 is able to lead the power supply to the electronic device 310, and turn on the first switch 131 to connect the alternator 120 and the second battery 220 with each other. In addition, the alternator 120 may be configured to adjust a voltage applied to the second battery 220, thereby adjusting the voltage applied to the electronic device 310 through the second battery 220.

In response to determining that the state of charge of the second battery 220 is less than the second reference value, the controller 140 may be configured to determine that the second battery 220 is not charged sufficiently to adjust the voltage applied to the electronic device 310. Accordingly, the controller 140 may be configured to operate the second battery 220 to be charged. To this end, the controller 140 may be configured to turn on the first switch 131 to connect the alternator 120 and the second battery 220 with each other, to turn off the second switch 132 to disconnect the second battery 220 and the electronic device 310 from each other, and to turn on the third switch 133 to connect the alternator 120 and the electronic device 310 with each other. Since the alternator 120 and the second battery 220 are connected to each other and the alternator 120 and the electronic device 310 are connected to each other, the controller 140 may be configured to fix the voltages applied from the alternator 120 to the second battery 220 and the electronic device 310.

In one example, in response to determining that the load has not occurred on the electronic device 310, the controller 140 may control be configured to turn off the second switch 132 and the third switch 133 to disconnect the second battery 220 and the electronic device 310 from each other and disconnect the alternator 120 and the electronic device 310 from each other. In this connection, the controller 140 may be configured to determine whether to charge based on states of charge of the first battery 210 and the second battery 220.

Figure 4:
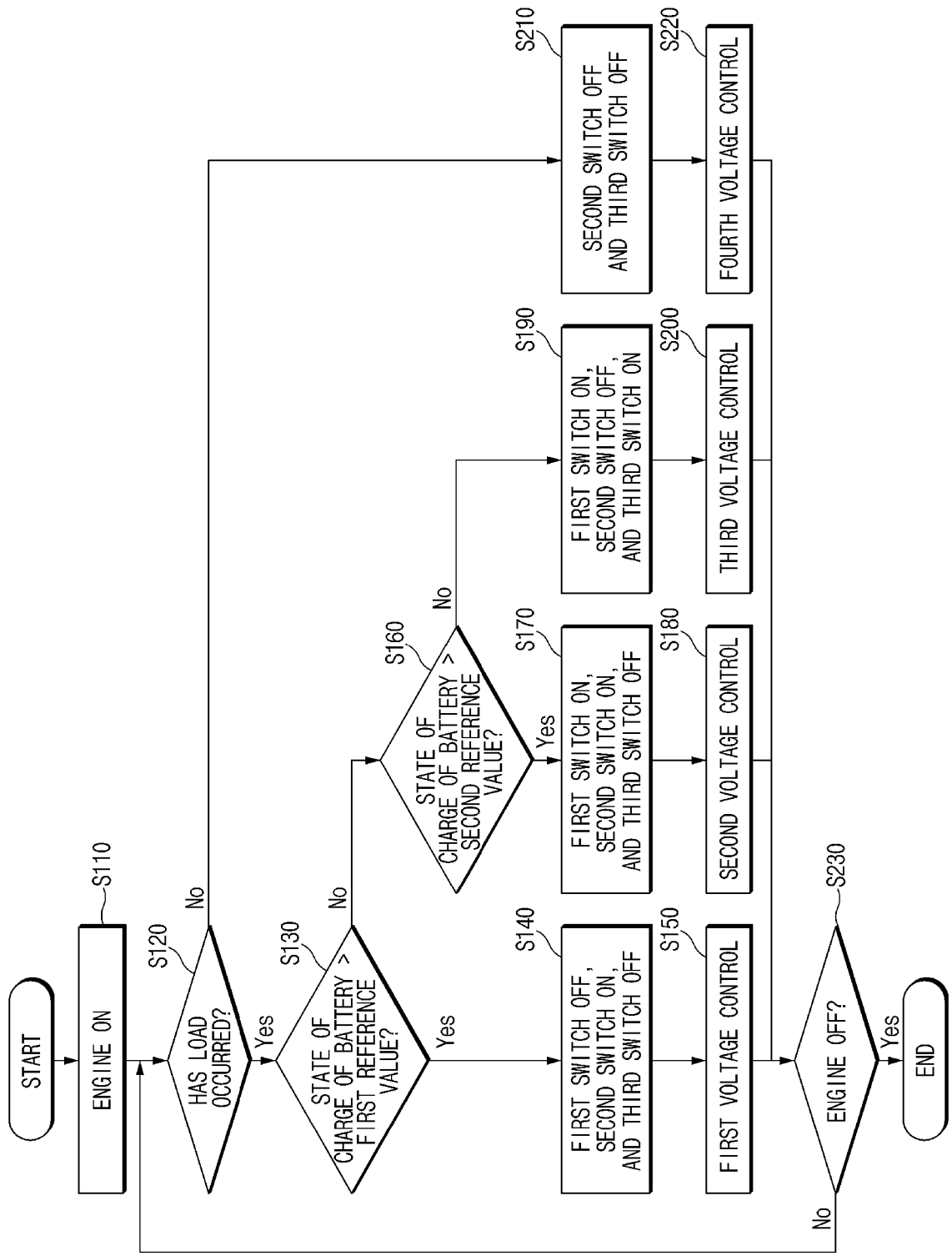
FIG. 4 is a flowchart illustrating a vehicle battery control method of the present disclosure.

FIG. 4 is a flowchart illustrating a vehicle battery control method of the present disclosure. As shown in FIG. 4, the controller 140 may be configured to determine whether an engine is turned on (S110). In response to determining the engine is turned on, the controller 140 may be configured to determine whether the load of the electronic device has occurred (S120). In response to determining in S120 that the load has occurred (Y), the controller 140 may be configured to determine the state of charge of the battery connected to the electronic device. According to an exemplary embodiment, the controller 140 may be configured to determine whether the state of charge of the second battery 220 connected to the electronic device 310 in FIGS. 2 and 3 exceeds the first reference value (S130). In this connection, the first reference value may refer to the state of charge of the battery capable of applying the voltage of the magnitude of not causing the performance change of the electronic device 310 to the electronic device 310.

Figure 5:
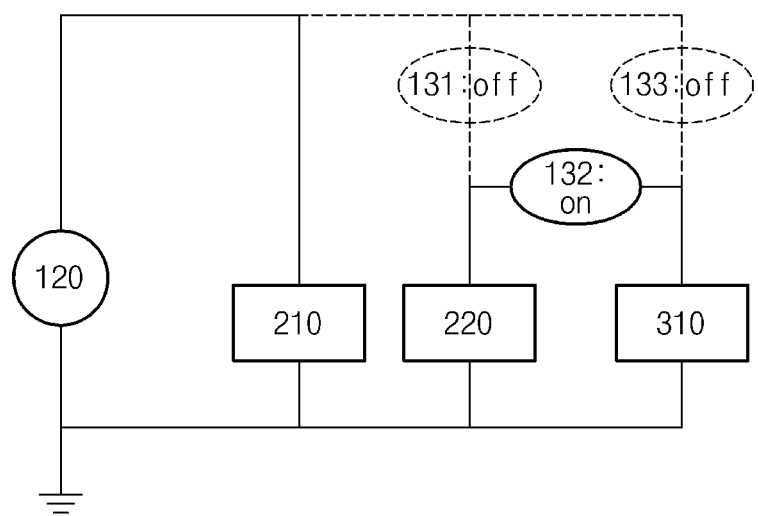
FIGS. 5 to 7 are views illustrating on/off states of switches controlled based on states of charge of a battery.

In response to determining that the state of charge of the second battery 220 exceeds the first reference value (Y), the controller 140 may be configured to determine that the second battery 220 is able to apply the voltage of the magnitude of not causing the performance change of the electronic device 310 to the electronic device 310. In response to determining in S130 that the state of charge of the second battery 220 exceeds the first reference value (Y), as shown in FIG. 5, the controller 140 may be configured to on/off of the switches. FIG. 5 is a view illustrating on/off states of switches controlled based on a state of charge of a battery.

As shown in FIG. 5, the controller 140 may be configured to turn off the first switch 131 to disconnect the alternator 120 and the second battery 220 from each other, to turn off the third switch 133 to disconnect the alternator 120 and the electronic device 310 from each other, to turn on the second switch 132 to connect the second battery 220 and the electronic device 310 with each other, and control to turn off the first switch 131 and the third switch 133 (S140).

The controller 140 may be configured to perform S140 to disconnect the alternator 120 and the second battery 220 from each other, thereby performing a first voltage control in which the alternator 120 adjust the voltage based on the state of the first battery 210 and the traveling pattern of the vehicle (S150). In S150, the controller 140 may allow the second battery 220 to adjust the voltage based on the required voltage of the electronic device 310, thereby improving the fuel efficiency. In addition, in S150, the controller 140 may allow maximum charging to be performed in the fuel cut section, minimize the charging in the section excluding the fuel cut section, and allow the available energy to be discharged in a section immediately after energy regeneration.

In one example, in S130, in response to determining that the state of charge of the second battery 220 is less than the first reference value (N), the controller 140 may be configured to determine whether the state of charge of the second battery 220 exceeds the second reference value (S160). In this connection, the second reference value may refer to the lower limit value of the state of charge of the battery capable of adjusting the voltage applied to the electronic device 310. Therefore, in response to determining that the state of charge of the second battery 220 exceeds the second reference value, the controller 140 may be configured to determine that the state of charge of the second battery 220 is in a lower limit state capable of supplying the power to the electronic device 310. In S160, the controller 140 may be configured to determine whether the electric potential of the second battery 220 is greater than the electric potential of the first battery 210.

Figure 6:
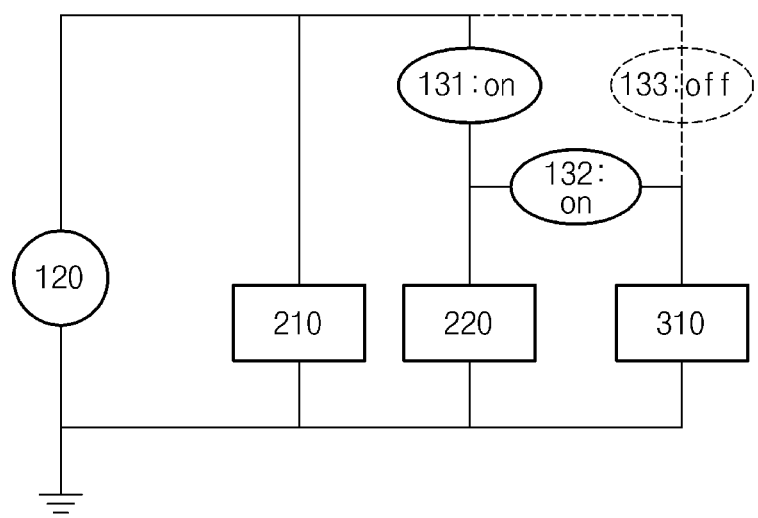

As shown in FIGS. 2 and 3, in response to determining that the electric potential of the second battery 220 is greater than the electric potential of the first battery 210 even though the first battery 210 and the second battery 220 are connected to each other in parallel, the controller 140 may be configured to determine that the second battery 220 is leading the power supply to the electronic device 310. In S160, the controller 140 may be configured to determine that the state of charge of the second battery 220 exceeds the second reference value (Y), and control the switches as shown in FIG. 6. FIG. 6 is a view illustrating on/off states of switches controlled based on a state of charge of a battery.

As shown in FIG. 6, in response to determining that the electric potential of the second battery 220 is greater than the electric potential of the first battery 210, the controller 140 may be configured to turn on the first switch 131 to connect the alternator 120 and the second battery 220 with each other, to turn on the second switch 132 to connect the second battery 220 and the electronic device 310 with each other, and to turn off the third switch 133 to disconnect the alternator 120 and the electronic device 130 from each other (S170).

The controller 140 connects the alternator 120 and the second battery 220 with each other, thereby adjusting the voltage based on the states of the first battery 210 and the second battery 220 and the traveling pattern. When the electric potential of the second battery is greater than the electric potential of the first battery, the controller 140 may be configured to determine that the second battery 220 is able to lead the power supply to the electronic device 310. In addition, the controller 140 may be configured to turn on the first switch 131 to connect the alternator 120 and the second battery 220 with each other and perform a second voltage control in which the alternator 120 adjusts the voltage applied to the second battery 220 to adjust the voltage applied to the electronic device 310 through the second battery 220 (S180). In S180, the controller 140 may allow the alternator 120 to variably adjust the voltage based on the state of the second battery 220 by turning on the first switch 131. In addition, when a voltage drop of the second battery 220 is advantageous for improving the fuel efficiency, the controller 140 may be configured to adjust the voltage of the second battery 220 to secure power stability of the electronic device 310.

Figure 7:
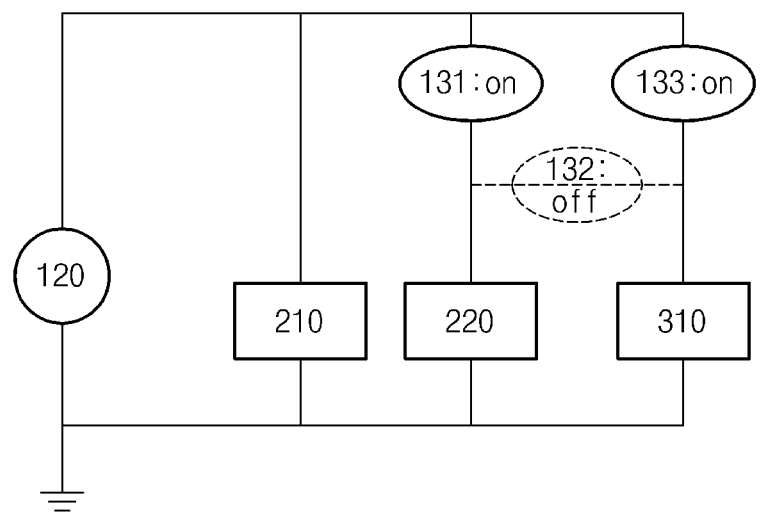

In one example, in response to determining in S160 that the state of charge of the second battery 220 is less than the second reference value (N), the controller 140 may be configured to determine that the second battery 220 is not charged sufficiently to adjust the voltage applied to the electronic device 310. Accordingly, the controller 140 may be configured to control the switches as shown in FIG. 7 to charge the second battery 220. FIG. 7 is a view illustrating on/off states of switches controlled based on a state of charge of a battery.

In response to determining in S160 that the state of charge of the second battery 220 does not exceed the second reference value (N), as shown in FIG. 7, the controller 140 may be configured to turn on the first switch 131 to connect the alternator 120 and the second battery 220 with each other, to turn off the second switch 132 to disconnect the second battery 220 and the electronic device 310 from each other, and to turn on the third switch 133 to connect the alternator 120 and the electronic device 310 with each other (S190). Since the alternator 120 and the second battery 220 are connected to each other and the alternator 120 and the electronic device 310 are connected to each other, the controller 140 may be configured to perform a third voltage control of fixing the voltages applied from the alternator 120 to the second battery 220 and the electronic device 310 (S200).

In one example, in response to determining in S120 that the load has not occurred on the electronic device 310(N), the controller 140 may be configured to turn off the second switch 132 and the third switch 133 to disconnect the second battery 220 and the electronic device 310 from each other and disconnect the alternator 120 and the electronic device 310 from each other (S210). Since the load does not occur on the electronic device 310, the controller 140 may be configured to perform a fourth voltage control of determining whether to charge based on the states of charge of the first battery 210 and the second battery 220 and adjusting the voltage based on whether to charge (S220).

After adjusting the voltages applied to the first battery 210, the second battery 220, and the electronic device 310, the controller 140 may be configured to determine whether the engine is turned off. In response to determining that the engine is turned off (Y), the controller 140 may be configured to terminate the operation. Further, in response to determining that the engine is not turned off, the controller 140 may be configured to perform S120.

Figure 8:
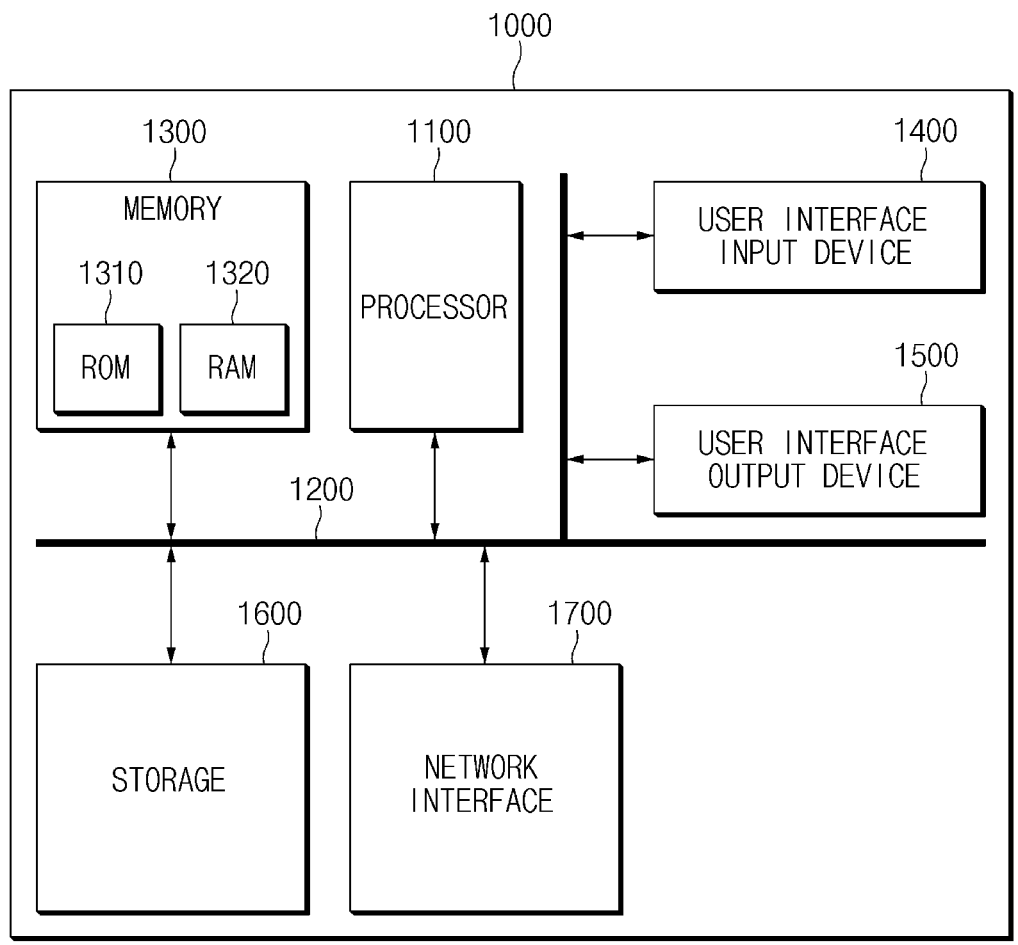
FIG. 8 illustrates a computing system in which a method according to an exemplary embodiment of the present disclosure is implemented.

FIG. 8 illustrates a computing system in which a method according to an exemplary embodiment of the present disclosure is implemented. With reference to FIG. 8, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure. The device and the method for controlling the battery in the vehicle may improve the fuel efficiency by controlling the connection of the battery when the load occurs on the electronic device.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a battery in a vehicle, comprising:
    a sensor configured to sense states of charge of a plurality of batteries;
    an alternator configured to adjust the voltages supplied to the plurality of batteries;
    a first switch disposed between: a first point connecting the alternator with a first battery of the plurality of batteries, and a second battery of the plurality of batteries;
    a second switch disposed between: a second point connecting the second battery with the first switch, and the electronic device;
    a third switch disposed between: a third point connecting the second switch with the electronic device, and the first point; and
    a controller configured to:
        determine whether the state of charge of the second battery exceeds a first reference value in response to determining that the load has occurred on the electronic device;

determine whether the state of charge of the second battery exceeds a second reference value less than the first reference value in response to determining that the state of charge of the second battery is less than the first reference value; and turn on the first switch to connect the alternator and the second battery with each other, to turn on the second switch to connect the second battery and the electronic device with each other, and to turn off the third switch to disconnect the alternator and the electronic device from each other in response to determining that the state of charge of the second battery exceeds the second reference value.

2. The device of claim 1, wherein the controller is configured to turn off the first switch to disconnect the alternator and the second battery from each other, to turn off the third switch to disconnect the alternator and the electronic device from each other, and to turn on the second switch to connect the second battery and the electronic device with each other in response to determining that the state of charge of the second battery exceeds the first reference value.

3. The device of claim 1, wherein the controller is configured to turn on the first switch to connect the alternator and the second battery with each other, to turn off the second switch to disconnect the second battery and the electronic device from each other, and to turn on the third switch to connect the alternator and the electronic device with each other in response to determining that the state of charge of the second battery does not exceed the second reference value.

4. A method for controlling a battery in a vehicle, comprising:

determining, by a controller, whether a load has occurred on an electronic device connected to one of a plurality of batteries;

adjusting, by an alternator, the voltages supplied to the plurality of batteries;

disposing a first switch between: a first point connecting the alternator and a first battery of the plurality of batteries, and a second battery of the plurality of batteries;

disposing a second switch between: a second point connecting the second battery and the first switch, and the electronic device;

disposing a third switch between: a third point connecting the second switch and the electronic device, and the first point;

determining, by the controller, whether the state of charge of the second battery exceeds a first reference value in response to determining that the load has occurred on the electronic device;

determining, by the controller, whether the state of charge of the second battery exceeds a second reference value less than the first reference value in response to determining that the state of charge of the second battery is less than the first reference value; and turning on, by the controller, the first switch to connect the alternator and the second battery with each other, turning on the second switch to connect the second battery and the electronic device with each other, and turning off the third switch to disconnect the alternator and the electronic device from each other in response to determining that the state of charge of the second battery exceeds the second reference value.

5. The method of claim 4, further comprising:

turning off, by the controller, the first switch to disconnect the alternator and the second battery from each other, turning off the third switch to disconnect the alternator and the electronic device from each other, and turning on the second switch to connect the second battery and the electronic device with each other in response to determining that the state of charge of the second battery exceeds the first reference value.

6. The method of claim 4, further comprising:

turning on, by the controller, the first switch to connect the alternator and the second battery with each other, turning off the second switch to disconnect the second battery and the electronic device from each other, and turning on the third switch to connect the alternator and the electronic device with each other in response to determining that the state of charge of the second battery is less than the second reference value.

* * * * *